(12) United States Patent
Aoyagi

(10) Patent No.: US 12,484,113 B2
(45) Date of Patent: Nov. 25, 2025

(54) EMERGENCY REPORT PROCESSING FOR COMMUNICATION CELL COVERED BY DIFFERENT EMERGENCY AGENCIES

(71) Applicant: RAKUTEN MOBILE, INC., Tokyo (JP)

(72) Inventor: Kenichiro Aoyagi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/905,505

(22) PCT Filed: Sep. 30, 2021

(86) PCT No.: PCT/JP2021/036192
§ 371 (c)(1),
(2) Date: Sep. 2, 2022

(87) PCT Pub. No.: WO2023/021714
PCT Pub. Date: Feb. 23, 2023

(65) Prior Publication Data
US 2024/0206013 A1    Jun. 20, 2024

(30) Foreign Application Priority Data
Aug. 19, 2021    (JP) .................... 2021-134286

(51) Int. Cl.
*H04W 76/50*    (2018.01)
*H04W 64/00*    (2009.01)
*H04W 84/06*    (2009.01)

(52) U.S. Cl.
CPC .......... *H04W 76/50* (2018.02); *H04W 64/006* (2013.01); *H04W 84/06* (2013.01)

(58) Field of Classification Search
None
See application file for complete search history.

(56) References Cited

U.S. PATENT DOCUMENTS 5,602,901 A * 2/1997 Redden .................. H04W 4/90
379/37
11,218,584 B2 * 1/2022 Martin .............. H04M 1/72421
(Continued)

FOREIGN PATENT DOCUMENTS

EP    3634041 A1    4/2020
JP    2002171571 A    6/2002
(Continued)

OTHER PUBLICATIONS

Office Action in JP Application No. 2023-542178, mailed Sep. 10, 2024, 6pp.
(Continued)

*Primary Examiner* — Adolf Dsouza
(74) *Attorney, Agent, or Firm* — HAUPTMAN HAM, LLP

(57) ABSTRACT

An emergency report processing apparatus includes: an emergency report detection unit that detects emergency report from a communicator in a communication cell including jurisdictional areas of different emergency agencies; a location information acquisition unit that acquires location information suggesting the location of the communicator in the communication cell; a location estimation unit that estimates the jurisdictional area of the either emergency agency in which the communicator is located based on the location information; and a connection control unit that connects the communicator to the emergency agency of the estimated jurisdictional area.

10 Claims, 8 Drawing Sheets

(56) References Cited

U.S. PATENT DOCUMENTS

| | | | |
|---|---|---|---|
| 11,228,891 B2* | 1/2022 | King-Berkman | H04W 4/90 |
| 11,399,271 B2* | 7/2022 | Lan | G01S 19/48 |
| 11,425,529 B2* | 8/2022 | Mehta | H04L 12/66 |
| 2007/0004378 A1 | 1/2007 | Muhonen | |
| 2014/0295885 A1 | 10/2014 | Marko | |
| 2019/0380020 A1* | 12/2019 | Pellegrini | G08B 25/006 |
| 2020/0252781 A1* | 8/2020 | Edge | H04W 40/20 |
| 2024/0121572 A1* | 4/2024 | Ramachandran | H04W 4/021 |

FOREIGN PATENT DOCUMENTS

| | | |
|---|---|---|
| JP | 2004265191 A | 9/2004 |
| JP | 2007251357 A | 9/2007 |
| JP | 2015043487 A | 3/2015 |
| JP | 2015076840 A | 4/2015 |
| JP | 2019198023 A | 11/2019 |
| WO | 2020066890 A1 | 4/2020 |

OTHER PUBLICATIONS

Extended European Search Report in EP Application No. 21954280.0, dated Sep. 19, 2024, 7pp.

* cited by examiner

FIG. 5

Initial UE Message (/TS 38.413 NGAP)

eNB/gNB → AMF

| IE/Group Name | Presence | Range | IE type and reference | Semantics description | Criticality | Assigned Criticality |
|---|---|---|---|---|---|---|
| Message Type | M | | 9.3.1.1 | | YES | ignore |
| RAN UE NGAP ID | M | | 9.3.3.2 | | YES | reject |
| NAS-PDU | M | | 9.3.3.4 | | YES | reject |
| User Location Information | M | | 9.3.1.16 | | YES | reject |
| RRC Establishment Cause | M | | 9.3.1.111 | | YES | ignore |
| 5G-S-TMSI | O | | 9.3.3.20 | | YES | reject |
| AMF Set ID | O | | 9.3.3.12 | | YES | ignore |
| UE Context Request | O | | ENUMERATED (requested, ...) | | YES | ignore |
| Allowed NSSAI | O | | 9.3.1.31 | | YES | reject |
| Source to Target AMF Information Reroute | O | | 9.3.3.27 | | YES | ignore |
| Selected PLMN Identity | O | | PLMN Identity 9.3.3.5 | Indicates the selected PLMN id for the non-3GPP access. | YES | ignore |
| IAB Node Indication | O | | ENUMERATED (true, ...) | Indication of an IAB node | YES | reject |
| CE-mode-B Support Indicator | O | | 9.3.1.156 | | YES | reject |
| LTE-M Indication | O | | 9.3.1.157 | | YES | ignore |
| EDT Session | O | | ENUMERATED (true, ...) | | YES | ignore |
| Authenticated Indication | O | | ENUMERATED (true, ...) | Indicates the FN-RG has been authenticated by the access network. | YES | ignore |
| NPN Access Information | O | | 9.3.3.46 | | YES | reject |

FIG. 6

User Location Information (/TS 38.413 NGAP)

| IE/Group Name | Presence | Range | IE type and reference | Semantics description | Criticality | Assigned Criticality |
|---|---|---|---|---|---|---|
| CHOICE User Location Information | M | | | | - | |
| >E-UTRA user location information | | | | | - | |
| >>E-UTRA CGI | M | | 9.3.1.9 | | - | |
| >>TAI | M | | 9.3.3.11 | | - | |
| >>Age of Location | O | | Time Stamp 9.3.1.75 | Indicates the UTC time when the location information was generated. | - | |
| >>PSCell Information | O | | NG-RAN CGI 9.3.1.73 | | YES | ignore |
| >NR user location information | | | | | - | |
| >>NR CGI | M | | 9.3.1.7 | | - | |
| >>TAI | M | | 9.3.3.11 | | - | |
| >>Age of Location | O | | Time Stamp 9.3.1.75 | Indicates the UTC time when the location information was generated. | - | |
| >>PSCell Information | O | | NG-RAN CGI 9.3.1.73 | | YES | ignore |
| >>NID | O | | 9.3.3.42 | | YES | reject |
| >N3IWF user location information | | | | | YES | ignore |
| >TNGF user location information | | | | | YES | ignore |
| >TWIF user location information | | | | | YES | ignore |
| >W-AGF user location information | | | | Indicates the location information via wireline access as specified in TS 23.316 [34]. | YES | ignore |

EMERGENCY REPORT PROCESSING FOR COMMUNICATION CELL COVERED BY DIFFERENT EMERGENCY AGENCIES

RELATED APPLICATIONS

The present application is a National Phase of International Application No. PCT/JP2021/036192, filed Sep. 30, 2021, and claims priority based on Japanese Patent Application No. 2021-134286, filed Aug. 19, 2021.

BACKGROUND OF THE INVENTION

1. Field of the Invention

The present disclosure relates to technology for processing emergency reports from communicators.

2. Description of the Related Art

The number, types, and applications of wireless communication devices, represented by smartphones and Internet of Things (IOT) devices, continue to increase, and wireless communication standards continue to be expanded and improved. For example, the commercial service of the 5th generation mobile communication system known as "5G" started in 2018, and the standards are still being developed by the 3GPP (Third Generation Partnership Project).

When a communicator, such as a smartphone, is used to make an emergency report or call to an emergency report phone number etc. of an emergency agency such as a police agency or fire department, the core network that detects the emergency report determines the emergency agency to which the communicator should be connected. Specifically, the core network connects the emergency agency that includes the location of the communication cell where the communicator is located, typically the location of the base station that provides the communication cell, in its jurisdictional area, as the connection destination for the emergency report. In other words, if the base station of the communication cell is located in area A, the emergency report from the communicator in the communication cell is connected to the emergency agency A that has jurisdictional area covering area A.

Patent Literature 1: JP-T-2021-503199

SUMMARY OF THE INVENTION

In 5G, the satellite communication via communication satellite has been studied, but some of the satellite communication cells provided by communication satellites are more than 20 km in diameter, and are generally larger than the mobile communication cells in mobile communication such as 5G and 4G (4th generation mobile communication system). In such a case, it is expected that the jurisdictional areas of several different emergency agencies may be included in one relatively large communication cell. For example, one communication cell may contain area A covered by emergency agency A and area B covered by emergency agency B. In this communication cell, if a communicator making an emergency report is located in area B, the emergency report should be connected to emergency agency B which covers area B. However, if the base station of the communication cell is located in area A, the emergency report will be connected to emergency agency A as described above.

The present disclosure was made in consideration of this situation, and its purpose is to provide an emergency report processing apparatus etc., which can connect an emergency report from a communicator to an appropriate emergency agency.

In order to solve the above problem, an emergency report processing apparatus in a certain aspect of the present disclosure comprises: an emergency report detection unit that detects emergency report from a communicator in a communication cell including jurisdictional areas of different emergency agencies; a location information acquisition unit that acquires location information suggesting the location of the communicator in the communication cell; a location estimation unit that estimates the jurisdictional area of the either emergency agency in which the communicator is located based on the location information; and a connection control unit that connects the communicator to the emergency agency of the estimated jurisdictional area.

According to this aspect, it is possible to estimate in which jurisdictional area of emergency agency the communicator is located based on the location information suggesting the location of the communicator in the communication cell, so that the emergency report from the communicator can be connected to the appropriate emergency agency. Although the above illustrates a satellite communication cell as a communication cell that contains the jurisdictional areas of different emergency agencies, a mobile communication cell in mobile communication such as 5G and 4G can also contain the jurisdictional areas of different emergency agencies. Therefore, this aspect can be applied not only to satellite communication cells but also to mobile communication cells.

Another aspect of the present disclosure is an emergency report processing method. The method comprises: detecting emergency report from a communicator in a communication cell including jurisdictional areas of different emergency agencies; acquiring location information suggesting the location of the communicator in the communication cell; estimating the jurisdictional area of the either emergency agency in which the communicator is located based on the location information; and connecting the communicator to the emergency agency of the estimated jurisdictional area.

In addition, any combination of the above components, and any conversion of the expression of the present disclosure among methods, devices, systems, recording media, computer programs, and the like, is also valid as a form of the present disclosure.

According to the present disclosure, an emergency report from a communicator can be connected to an appropriate emergency agency.

BRIEF DESCRIPTION OF THE DRAWINGS

FIG. 5 shows an example of an initial message from a UE. FIG. 6 shows an example of the user location information included in the initial message from the UE.

DETAILED DESCRIPTION OF THE INVENTION

Figure 1:
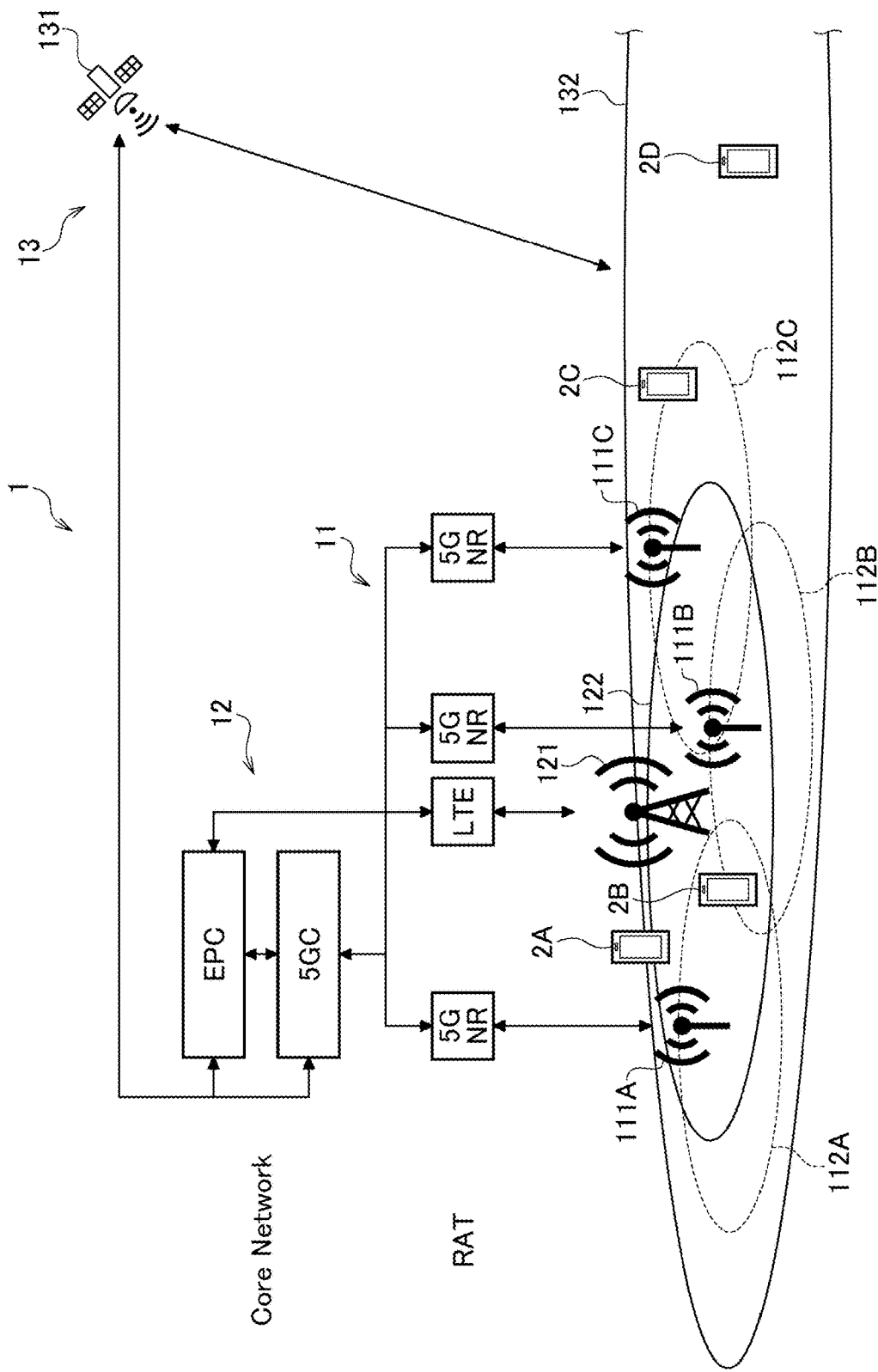
FIG. 1 is a schematic overview of wireless communication system to which the emergency report processing apparatus is applied.

FIG. 1 schematically shows an overview of a wireless communication system 1 to which the emergency report processing apparatus according to an embodiment of the present disclosure is applied. The wireless communication system 1 includes 5G wireless communication system 11, 4G wireless communication system 12, and satellite communication system 13. 5G wireless communication system 11 that complies with the 5th generation mobile communication system (5G) uses NR (New Radio) or 5G NR (Fifth Generation New Radio) as the radio access technology (RAT) and 5GC (Fifth Generation Core) as the core network. 4G wireless communication system 12 that complies with the 4th generation mobile communication system (4G) uses LTE (Long Term Evolution) or LTE-Advanced as the radio access technology and EPC (Evolved Packet Core) as the core network. Satellite communication system 13 is for satellite communication via communication satellite 131. Although not shown in the figure, the wireless communication system 1 may include wireless communication networks of a generation prior to 4G, a generation later than 5G, or any wireless communication networks that are not associated with generations, such as Wi-Fi (registered trademark).

The 5G wireless communication system 11 may include 5G base stations 111A, 111B, and 111C (hereinafter collectively referred to as 5G base station 111) capable of communicating by 5G NR with communication devices or communicators 2A, 2B, 2C, and 2D (hereinafter collectively referred to as communicator 2) such as smartphones, which are also referred to as UE (User Equipment). 5G base station 111 is also referred to as gNodeB (gNB). The coverage or support range of each 5G base station 111A, 111B, and 111C is referred to as a cell 112A, 112B, and 112C (hereinafter collectively referred to as cell 112).

The size of the 5G cell 112 of each 5G base station 111 is arbitrary, but typically ranges from a few meters to several tens of kilometers in radius. Although there is no established definition, cells with a radius of a few meters to ten meters are called femtocells, cells with a radius of ten meters to several tens of meters are called picocells, cells with a radius of several tens of meters to several hundred meters are called microcells, and cells with a radius of more than several hundreds of meters are called macrocells. In 5G, high frequency radio waves such as millimeter waves are often used, and their high tendency to propagate in a straight-line causes radio waves to be blocked by obstacles, shortening the communication distance. For this reason, 5G tends to use more small cells than 4G and earlier generations.

The communicator 2 can conduct 5G communication when it is located within at least one of a plurality of 5G cells 112A, 112B, and 112C. In the example shown in the figure, communicator 2B in 5G cells 112A and 112B can communicate with both 5G base stations 111A and 111B by 5G NR. In addition, the communicator 2C in the 5G cell 112C can communicate with the 5G base station 111C by 5G NR. Communicator 2A and 2D are outside of all 5G cells 112A, 112B, and 112C, so it is not able to communicate by 5G NR. The 5G NR-based 5G communication between each communicator 2 and each 5G base station 111 is managed by the 5GC, which is the core network. For example, the 5GC transfers data to and from each 5G base station 111, transfers data to and from external networks such as the EPC, the communication satellite 131 and the Internet, and manages the movement of the communicator 2.

The 4G wireless communication system 12 comprises a plurality of 4G base stations 121 (only one of them is shown in FIG. 1) that can communicate with the communicator 2 by LTE or LTE-Advanced. The base station 121 in 4G is referred to as eNodeB (eNB). Similarly to each 5G base station 111, the communication range or support range of each 4G base station 121 is also called a cell and is shown as 122.

The communicator 2 can conduct 4G communication when it is located within 4G cell 122. In the example shown in the figure, the communicators 2A and 2B in the 4G cell 122 can communicate with the 4G base station 121 by LTE or LTE-Advanced. Communicator 2C and 2D are outside the 4G cell 122 and is not able to communicate by LTE or LTE-Advanced. The 4G communication by LTE and LTE-Advanced between each communicator 2 and each 4G base station 121 is managed by the EPC, which is the core network. For example, the EPC manages the transfer of data to and from each 4G base station 121, the transfer of data to and from external networks such as 5GC, communication satellite 131 and the Internet, and the movement management of the communicator 2.

If we take a look at each communication device 2A, 2B, 2C and 2D in the example shown in the figure, the communication device 2A is in a state that enables 4G communication with 4G base station 121, and communication device 2B is in a state that enables 5G communication with 5G base stations 111A and 111B and 4G communication with 4G base station 121, and communication device 2C is in a state that enables 5G communication with 5G base station 111C. When there are multiple base stations (111A, 111B and 121) as in the case of communicator 2B, one base station is selected as the most suitable for the communicator 2B in terms of communication quality etc., under the control of the 5GC and/or EPC, which is the core network. For the communicator 2D that is not in a state that enables 5G communication with any 5G base station 111 or 4G communication with any 4G base station 121, the communication is performed using the satellite communication system 13 described below.

The satellite communication system 13 is the wireless communication system using communication satellites 131 as base stations. The communication satellites 131 are low earth orbit satellites flying in low earth orbit of 500 to 700 km above the ground. Similarly to 5G base station 111 and 4G base station 121, the communication range or support range of each communication satellite 131 is also called a cell and is shown as 132. The communicator 2 can conduct satellite communication when it is located within satellite communication cell 132. Similarly to 5G base station 111 in the 5G wireless communication system 11 and 4G base station 121 in the 4G wireless communication system 12, communication satellite 131 as the base station in the satellite communication system 13 is capable of wireless communication directly or indirectly via aircraft etc. with the communicator 2 within the satellite communication cell 132. The radio access technology used by the communication satellite 131 for wireless communication with the communicator 2 in the satellite communication cell 132 may be 5G NR, the same as the 5G base station 111, or LTE or LTE-Advanced, the same as the 4G base station 121, or any other radio access technology that the communicator 2 can use. Therefore, there is no need for the communicator 2 to have any special functions or components for satellite communication.

When the communication satellite 131 uses 5G NR for 5G communication with the communicator 2 in the satellite communication cell 132, 5GC is used as the core network, and when the communication satellite 131 uses LTE or LTE-Advanced for 4G communication with the communicator 2 in the satellite communication cell 132, EPC is used as the core network. Although not shown in the figure, the network facilities comprising the 5GC and/or EPC are equipped with satellite antennas and other satellite communication devices for communication with the communication satellite 131, so that appropriate coordination among different wireless communication systems such as 5G communication, 4G communication, satellite communication etc. is realized.

Satellite communication by communication satellites 131 is mainly used for covering areas with no or few terrestrial base stations such as 5G base stations 111 and 4G base stations 121 etc. In the example shown in the figure, a communicator 2D that is outside the communication cells of all the terrestrial base stations communicates with the communication satellite 131. On the other hand, communicators 2A, 2B and 2C that are in good communication with either of the terrestrial base stations, are also in the satellite communication cell 132 and can communicate with the communication satellite 131. However, by communicating with the terrestrial base station instead of the communication satellite 131 as the satellite base station, the limited communication resources of the communication satellite 131 are saved for the communicator 2D etc. The communication satellite 131 uses beamforming to direct the communication radio wave to the communicator 2D in the satellite communication cell 132, thereby the communication quality with the communicator 2D is improved.

The size of the satellite communication cell 132 of the communication satellite 131 as a satellite base station depends on the number of beams emitted by the communication satellite 131. For example, a satellite communication cell 132 with a diameter of about 24 km can be formed by combining up to 2,800 beams. As illustrated, a satellite communication cell 132 is typically larger than a terrestrial communication cell such as a 5G cell 112 or a 4G cell 122, and could contain one or more 5G cells 112 and/or 4G cells 122 inside it.

Figure 2A:
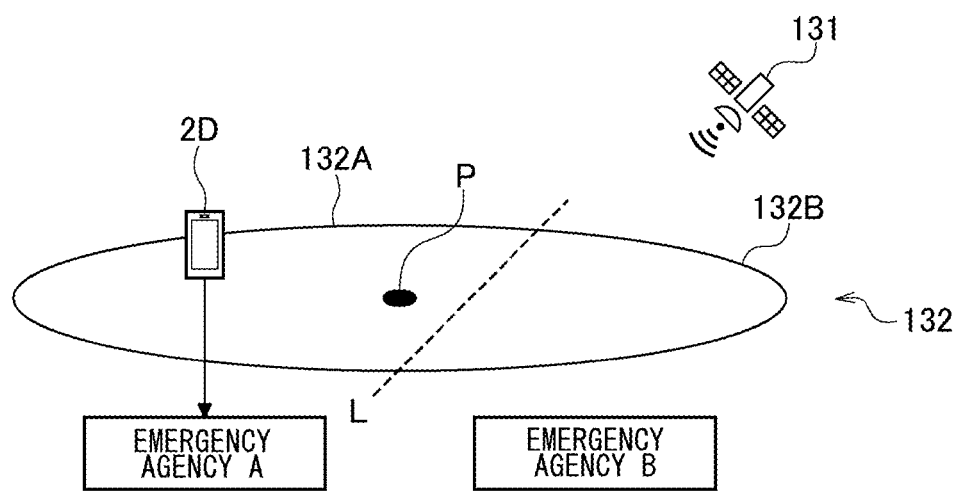
FIGS. 2A and 2B show a schematic diagram of a communicator in a satellite communication cell making an emergency report to an emergency agency.
Figure 2B:
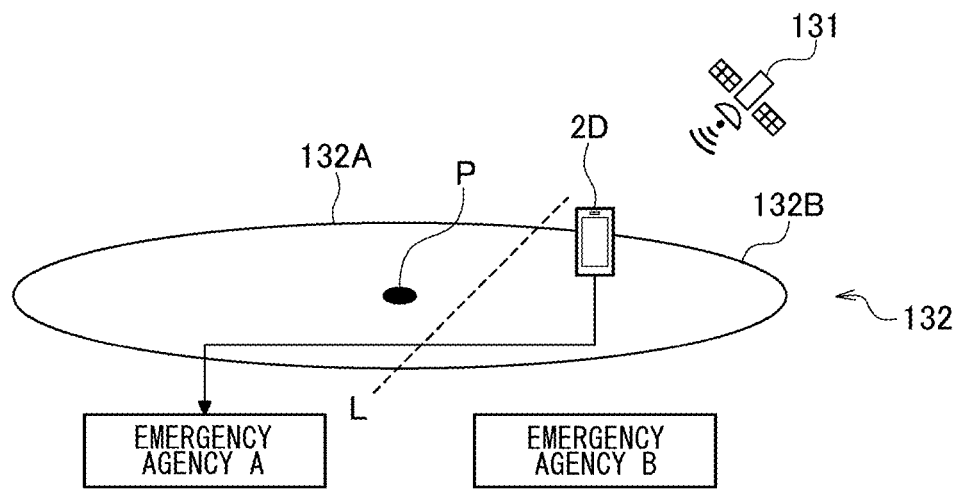

FIGS. 2A and 2B schematically show how a communicator 2D in a satellite communication cell 132 in communication with a communication satellite 131 makes an emergency report to an emergency agency such as a police agency or a fire department. An example of an emergency report is a call to the emergency call number of each emergency agency. In Japan, "110" is assigned for emergency reports to police agencies, "119" for emergency reports to fire departments, and "118" for emergency reports to the Japan Coast Guard. The emergency report by eCall, which is an emergency report system for car accidents in Europe, is also an example of emergency report. The communication unit in the car (that corresponds to the communicator 2D shown in the figure) makes an emergency report on the wireless communication system 1 about the occurrence of a car accident and its location. The emergency report by Emergency Services Fallback (ES-FB) and EPS Fallback (Evolved Packet System Fallback) specified in the 5th generation mobile communication system is also an example of emergency report.

In the example shown in the figure, the satellite communication cell 132 contains the jurisdictional areas of different emergency agencies. Specifically, the satellite communication cell 132 is divided by the boundary line L into the jurisdictional area 132A of the emergency agency A and the jurisdictional area 132B of the emergency agency B. There may be overlapping areas among the jurisdictional area 132A and the jurisdictional area 132B. P is a representative point representing the location of the satellite communication cell 132, which belongs to the jurisdictional area 132A in the example shown in the figure. The representative point P may be any point in the satellite communication cell 132, but typically it is a point near the geographical center of the satellite communication cell 132.

The location information of the representative point P of the satellite communication cell 132 can be obtained from the Cell Global Identity (CGI) of the satellite communication cell 132, which is stored in 5GC, EPC, and other core networks for satellite communication. The CGI is the identifier or the ID uniquely assigned to each communication cell in mobile communication network or wireless communication system 1 supporting satellite communication. The CGI consists of four parts: MCC (Mobile Country Code), MNC (Mobile Network Code), LAC (Location Area Code), and CI (Cell Identification).

MCC and MNC constitute PLMN (Public Land Mobile Network), which is an identifier of each wireless communication network provided by each operator in each country/region, and PLMN and LAC constitute LAI (Location Area Identity), which is an identifier of the geographic location of each wireless communication network. In the example of FIGS. 2A and 2B, the geographical location of the representative point P of the satellite communication cell 132 can be recognized by looking up its LAI stored in the core network, and thus it can be recognized that the representative point P belongs to the jurisdictional area 132A of the emergency agency A. Various technologies developed based on CGI such as CGI+TA, E-UTRAN CGI (ECGI), E-CGI, U-TDOA, ATI, A-GPS etc. may be used in place of or in addition to CGI.

FIGS. 2A and 2B show how the emergency report made in the satellite communication cell 132 by the communicator 2D in communication with communication satellite 131 is connected according to the representative point P detected by the core network based on the CGI. In FIG. 2A, the communicator 2D is in the jurisdictional area 132A of the emergency agency A, and in FIG. 2B, the communicator 2D is in the jurisdictional area 132B of emergency agency B. In both cases, the core network detects the emergency report from the communicator 2D, and detects the geographic location of the representative point P based on the CGI of the satellite communication cell 132, and connects the emergency report to the emergency agency A whose jurisdictional area 132A contains the representative point P. In FIG. 2A, where the communicator 2D is in the jurisdictional area 132A, the emergency report is connected to the correct emergency agency A. In FIG. 2A. However, in FIG. 2B, where communicator 2D is in jurisdiction area 132B, the emergency report is not connected to the correct emergency agency B, but to the wrong emergency agency A.

Figure 3:
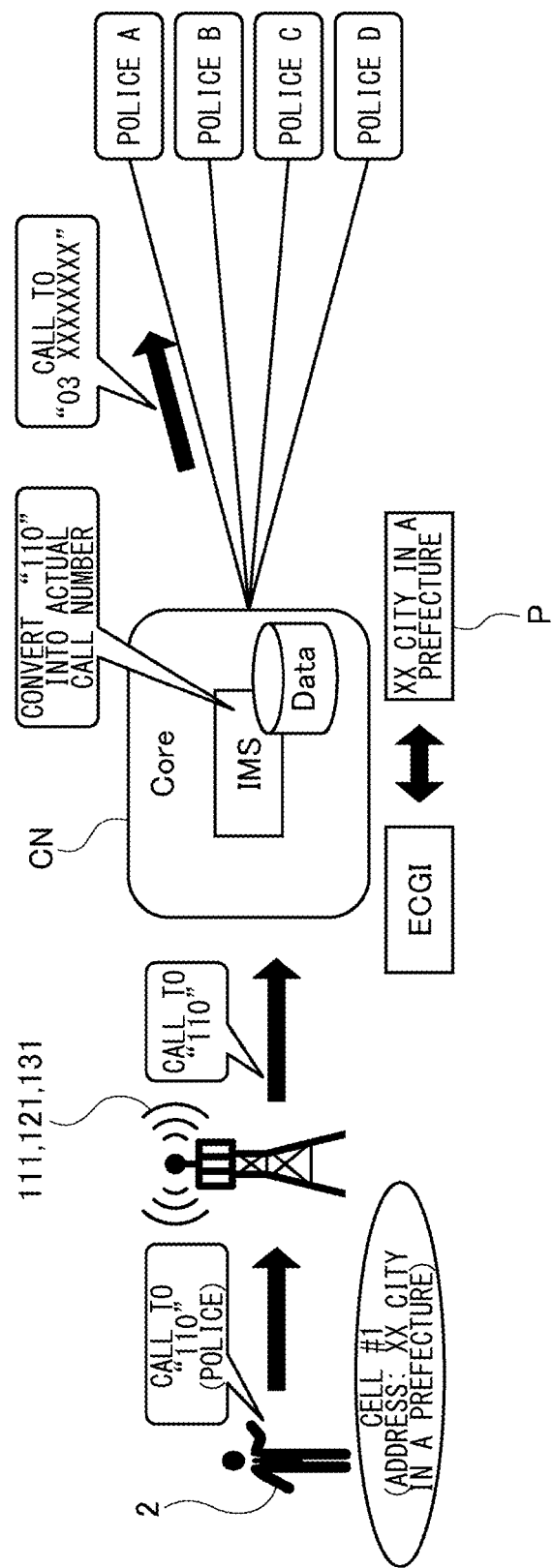
FIG. 3 shows the connection process of an emergency report based on ECGI.

FIG. 3 schematically shows the process of connecting an emergency report based on ECGI. The user of the communicator 2 is in the communication cell "Cell #1" with "xx city in A prefecture" as the representative point P, and makes an emergency call (emergency report) to the emergency call number "110" assigned to the police agency in Japan. The 5GC, EPC or other core network CN for satellite communication receives the emergency report via the terrestrial base station 111, 121 or satellite base station 131, and in its IMS (IP Multimedia Subsystem) converts the emergency call number "110" into the actual call number of the police command center etc., which is the emergency agency in charge of this emergency report. In this case, the core network CN refers to the ECGI of the communication cell (terrestrial communication cell 112, 122 or satellite communication cell 132 provided by the terrestrial base station 111, 121 or satellite base station 131) that originated the emergency report (specifically, the core network CN obtains the ECGI from the base station according to a predefined procedure or process such as "PCC based NPLI retrieval"), and recognizes the location "xx city in A prefecture" of the representative point P. As the result, the call number "110" for emergency report is converted into the actual call number "03xxxxxxxx" of "Police A" whose jurisdictional area contains "xx city in A prefecture". In this way, the emergency report to the emergency call number "110" from the communicator 2 in the communication cell "Cell #1" is connected to "Police A", the emergency agency in charge.

Figure 4:
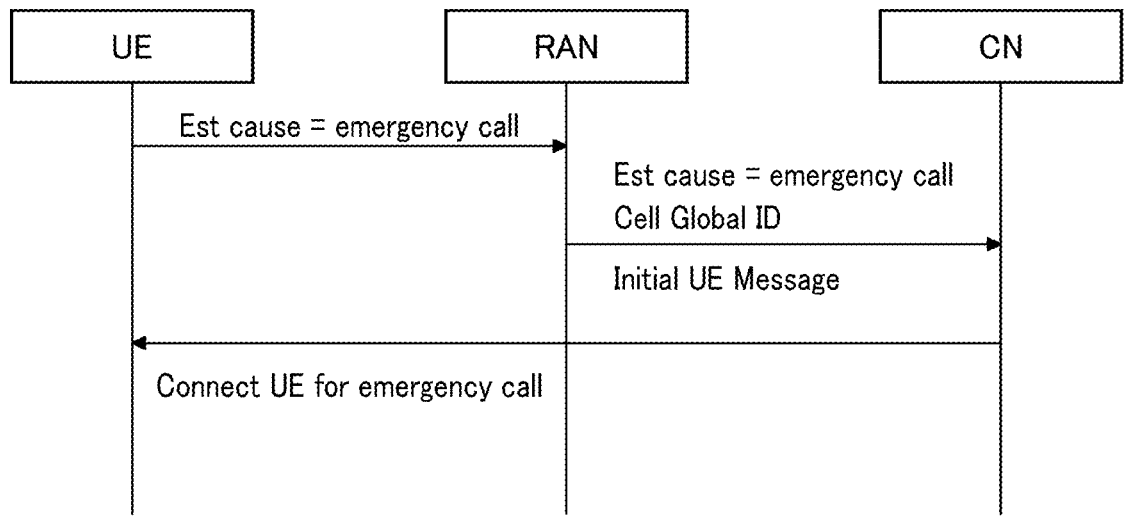
FIG. 4 shows the flow of the connection process for an emergency call based on CGI.

FIG. 4 shows the flow of the connection process for an emergency call based on CGI. First, the UE (User Equipment), which is a communicator such as a smartphone, notifies the RAN (Radio Access Network) of the occurrence of an emergency call. The RAN is a radio access network composed of terrestrial base stations 111, 121 or satellite base stations 131. When the RAN receives an emergency call and notifies the core network CN of the emergency call, it provides the CGI of the terrestrial communication cell 112, 122 or satellite communication cell 132 that originated the emergency call to the core network CN, according to the predefined procedure such as "PCC based NPLI retrieval". The RAN that receives the emergency call also sends the Initial UE Message from the UE to the core network CN.

FIG. 5 shows a specific example of the initial message from the UE. The initial message from the UE is sent to the AMF (Access and Mobility Management Function) included in the core network CN, from the eNB (121), which is the 4G base station connected to the UE, the gNB (111), which is the 5G base station connected to the UE, communication satellite 131, which is a satellite base station connected to the UE. FIG. 6 shows a specific example of the user location information included in the initial message from the UE in FIG. 5. Since this user location information includes CGI information such as "E-UTRA CGI" and "NR CGI", the core network CN that receives this information can recognize the location of the representative point P of the terrestrial communication cells 112, 122 or satellite communication cell 132 that originated the emergency call. Then, the core network CN connects the emergency call from the UE to the emergency agency whose jurisdictional area contains the representative point P.

In FIGS. 3 to 6, as in FIG. 2B, since the UE (communicator 2D in FIG. 2B) is in the jurisdictional area of another emergency agency (emergency agency B in FIG. 2B) whose jurisdictional area does not include the representative point P, the emergency call is not connected to the correct emergency agency (B), but is connected to the wrong emergency agency (A) whose jurisdictional area includes the representative point P.

Figure 7:
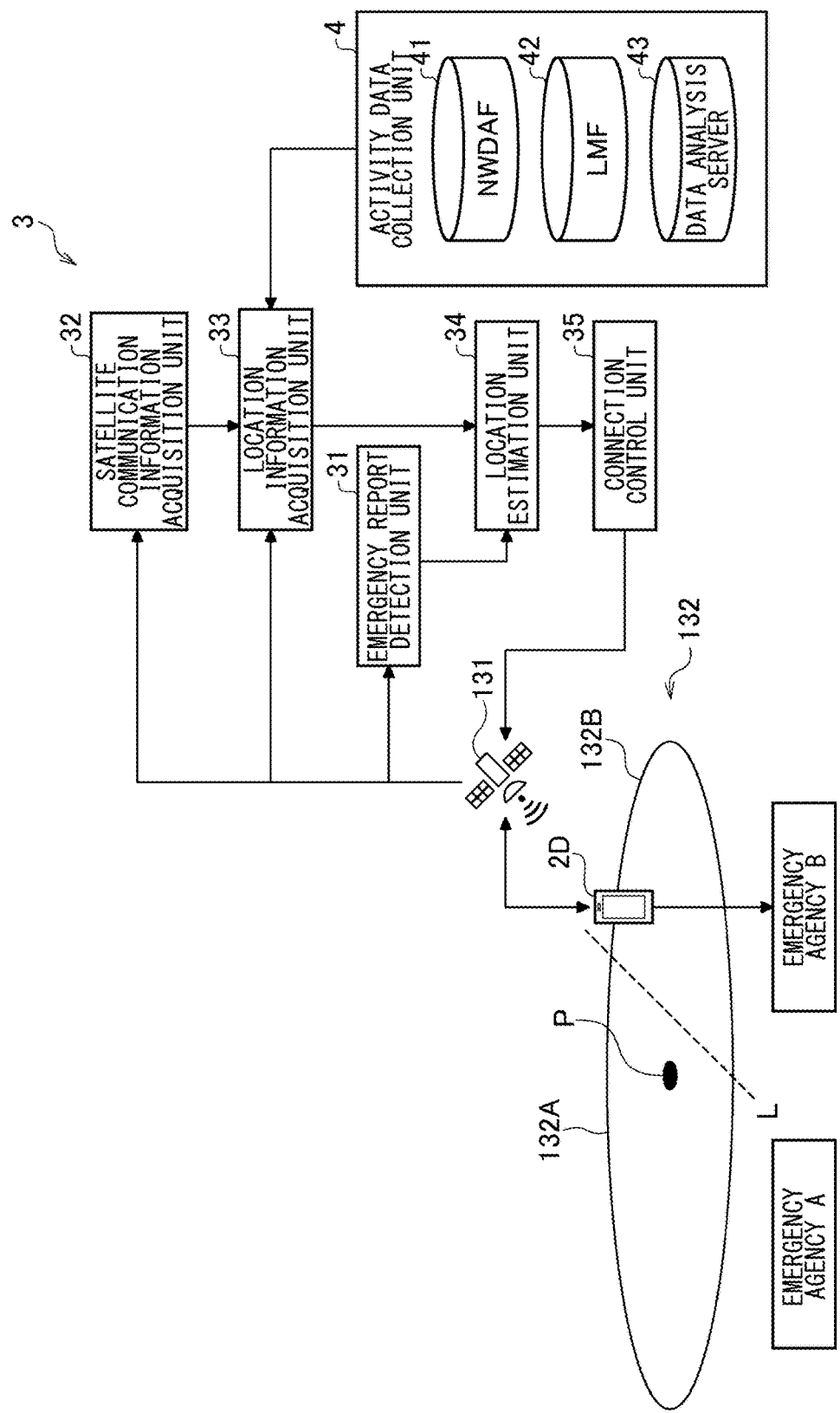
FIG. 7 is a functional block diagram of the emergency report processing apparatus.

FIG. 7 shows a functional block diagram of the emergency report processing apparatus 3 that can solve the problems of FIGS. 2A to 6. The emergency report processing apparatus 3 has an emergency report detection unit 31, a satellite communication information acquisition unit 32, a location information acquisition unit 33, a location estimation unit 34 and a connection control unit 35. These functional blocks are realized by the cooperation of hardware resources, such as the central processing unit, memory, input devices, output devices, and peripheral devices connected to the computer, and software that is executed using them. Regardless of the type of computer or its installation location, each of the above functional blocks may be realized with the hardware resources of a single computer, or by combining hardware resources distributed across multiple computers. Specifically, some or all of each of the above functional blocks may be realized by hardware resources and/or software in 5GC, EPC or other core network CN for satellite communications.

In the example of FIG. 7, as in FIG. 2B, the communicator 2D is in the satellite communication cell 132 provided by the communication satellite 131 as a satellite base station. As in FIG. 2B, the representative point P of the satellite communication cell 132 is included in the jurisdictional area 132A of the emergency agency A, and the communicator 2D is within the jurisdictional area 132B of the emergency agency B. 32B. The emergency report detection unit 31 is able to detect an emergency report from the communicator 2D within the satellite communication cell 132 including the jurisdictional areas 132A and 132B of different emergency agencies A and B via communication satellite 131. An example of an emergency report is an emergency call to the emergency call number of the emergency agency as described in FIG. 3. The satellite communication cell 132 may include jurisdictional areas of three or more different emergency agencies. Not only the satellite communication cell 132 provided by the communication satellite 131 as a satellite base station, but also 5G cell 112 or 4G cell 122 as the terrestrial communication cell provided by 5G base station 111 or 4G base station 121 as terrestrial base station can contain the jurisdictional areas of different emergency agencies. The present embodiment can be applied to such cases, in the same way as described below for satellite communication cell 132.

The satellite communication information acquisition unit 32 acquires information indicating that the communicator 2D is in the satellite communication cell 132. Specifically, the satellite communication information acquisition unit 32 acquires information about communications, not limited to emergency reports, performed by the communicator 2D from the communication satellite 131, it can detect that the communicator 2D is in the satellite communication cell 132. Alternatively, the core network CN, in which the satellite communication information acquisition unit 32 is implemented, can recognize communication cell in communication or ready for communication with the communicator 2D, and thus can detect that the communicator 2D is in satellite communication cell 132 as in FIG. 7. In addition, when the satellite communication information acquisition unit 32 is able to acquire positioning information from the GPS module etc. implemented in the communicator 2D via communication satellite 131 etc., it can be determined whether the geographical location of the communicator 2D is in the satellite communication cell 132.

The location information acquisition unit 33 acquires location information suggesting the location of the communicator 2D in the satellite communication cell 132. In the example of FIG. 7, the location information indicating whether the communicator 2D in the satellite communication cell 132 is in the jurisdictional area 132A of the emergency agency A or in the jurisdictional area 132B of the emergency agency B is acquired by the location information acquisition unit 33.

The location information acquisition unit 33 obtains, for example, the location information suggesting the location of the communicator 2D in the satellite communication cell 132, from the activity data collection unit 4, which collects activity data of one or more communicators 2. The activity data collection unit 4 is a concept or functional unit that encompasses various databases, data analysis engines, artificial intelligence with machine learning capabilities, and servers of service providers that provide various services using these elements. For example, as shown in the figure, NWDAF (Network Data Analytics Function) 41, LMF (Location Management Function) 42, and other data analysis servers 43 are included in the activity data collection unit 4. It is preferable that the communicators 2D itself in FIG. 7 is included in the one or more communicators 2 for which the activity data collection unit 4 collects activity data. However, as described below, it is also possible to obtain an indication of the location of the communicator 2D only from the activity data of communicators 2 other than the communicator 2D.

The NWDAF 41 is a function introduced in the 5GC, the core network of 5G, and is responsible for collecting and analyzing data on the network including 5G network. Specifically, NWDAF 41 collects and accumulates activity data on various activities performed on the network by a number of communicators 2 connected to the network, and utilizes the analysis results for traffic control on the network, for example. The LMF 42 is a function introduced in the 5GC, the core network of 5G, and manages the physical location of each communicator 2 on the network including 5G network. In other wireless communication systems, including those of later generations than 5G, functions similar to NWDAF 41 and/or LMF 42 might be provided under different names. The terms "NWDAF" and/or "LMF" in the present disclosure and/or embodiments also encompass such similar functions.

The other data analysis server 43 is, for example, a server used by service providers that provide map services and/or location tracking services for a large number of communicators 2 connected to a network. In these services, location data of a large number of communicators 2 connected to the network is collected and stored from GPS modules etc., and based on the analysis of the data, data on congestion level for each time period in each area, for example, is generated and utilized for service quality improvement etc.

Among the components included in the activity data collection unit 4 described above, from NWDAF 41 and the data analysis server 43, the location information acquisition unit 33 can acquire statistical data on the activities on the network or historical data on the physical locations of mainly an unspecified number of communicators 2. In the example of FIG. 7, the congestion level, communication traffic, and other data for each time period in the jurisdictional area 132A of the emergency agency A and the jurisdictional area 132B of the emergency agency B, respectively, in the satellite communication cell 132, are acquired by the location information acquisition unit 33 from the NWDAF 41 and the data analysis server 43 as the location information suggesting the location of the communicator 2D in the satellite communication cell 132. For example, during the time period when the emergency report detection unit 31 detects an emergency report from the communicator 2D, if the location information from the NWDAF 41 and the data analysis server 43 suggests that the number and/or communication volume of the communicators 2 in the jurisdictional area 132B are higher on average than the number and/or communication volume of the communicators 2 in the jurisdictional area 132A, it can be presumed that the communicator 2D that originated the emergency report is likely to be in the jurisdictional area 132B.

In the case where the historical data of the location of the communicator 2D that originated the emergency report can be obtained, in addition to or instead of the location information of an unspecified number of communicators 2 obtained from the NWDAF 41 and the data analysis server 43, it is possible to accurately estimate the location of the communicator 2D in the satellite communication cell 132. For example, during the time period when the emergency report detection unit 31 detects an emergency report from the communicator 2D, if the location information from the NWDAF 41 and the data analysis server 43 suggests that the communicator 2D was more frequently in the jurisdictional area 132B than in the jurisdictional area 132A in the past, it can be presumed that the communicator 2D that originated the emergency report is highly likely to be in the jurisdictional area 132B. In addition to or instead of the historical data of the location on past days, the historical data of the location of the communicator 2D immediately before (e.g. within one hour) the communicator 2D originated the emergency report may be used. For example, if the location information from the NWDAF 41 and the data analysis server 43 suggests that the communicator 2D was in the jurisdictional area 132B within 30 minutes before the emergency report, it can be presumed that the communicator 2D that originated the emergency report is highly likely to remain in the jurisdictional area 132B.

In contrast to NWDAF 41 and data analysis server 43, which collect location information of an unspecified number of communicators 2, the LMF 42 can collect location information of a specific communicator 2D such as statistical data on its activities on the network or historical data on its physical location. For example, during the time period when the emergency report detection unit 31 detects an emergency report from the communicator 2D, if the location information from the LMF 42 suggests that the communicator 2D was more frequently in the jurisdictional area 132B than in the jurisdictional area 132A in the past, it can be presumed that the communicator 2D that originated the emergency report is highly likely to be in the jurisdictional area 132B. If the location information from the LMF 42 suggests that the communicator 2D was in the jurisdictional area 132B within 30 minutes before the emergency report, it can be presumed that the communicator 2D that originated the emergency report is highly likely to remain in the jurisdictional area 132B.

The historical data of the location of a specific communicator 2D as described above can be obtained from the GPS module or memory implemented in the communicator 2D via a communication satellite 131 by the location information acquisition unit 33 directly. However, if the location information is acquired from the communicator 2D after the emergency report detection unit 31 detects the emergency report from the communicator 2D, the response to the emergency situation will be delayed. Therefore, it is preferable that the location information acquisition unit 33 obtains the location information from the communicator 2D in advance, before the emergency report detection section 31 detects an emergency report from the communicator 2D. Similarly, the acquisition of location information from the activity data collection unit 4 by the location information acquisition unit 33 should be done in advance before the emergency report detection unit 31 detects an emergency report from the communication unit 2D.

On the other hand, the location information to be acquired by the location information acquisition unit 33 is necessary when one communication cell includes the jurisdictional areas of different emergency agencies, as in the example in FIG. 7, and is not necessary when one communication cell includes only one jurisdictional area of one emergency agency. Therefore, in the embodiment of FIG. 7, only when the information indicating that the communicator 2D is in the satellite communication cell 132 is acquired by the satellite communication information acquisition unit 32, the location information acquisition unit 33 acquires the location information from the activity data collection unit 4 and/or the communicator 2D. This is because, as mentioned above, many satellite communication cells 132 have a diameter of more than 20 km and are likely to include the jurisdictional areas of several different emergency agencies.

Alternatively, if the core network CN is able to recognize in advance that an individual satellite communication cell 132 actually contains the jurisdictional areas of several different emergency agencies, the location information acquisition unit 33 may acquire location information only for the communicator 2D in such a satellite communication cell 132, while the location information acquisition unit 33 may not acquire location information for communicators outside such a satellite communication cell 132. Similarly, for terrestrial communication via the terrestrial base stations 111 and 121, the location information acquisition unit 33 may acquire location information only for communicator 2 in terrestrial communication cell 112, 122 which contains the jurisdictional areas of several different emergency agencies, while the location information acquisition unit 33 may not acquire location information for communicators outside such a terrestrial communication cell 132, 122.

The location estimation unit 34 estimates the location of the communicator 2D for which the emergency report detection section 31 has detected an emergency report within the satellite communication cell 132, whether it is in the jurisdictional area 132A of the emergency agency A or the jurisdictional area 132B of the emergency agency B, based on the location information of the communicator 2D that the location information acquisition unit 33 preferably acquired in advance before the emergency report. While the specific example of the estimation is described above, in the example of FIG. 7, it is estimated that the communicator 2D is in the jurisdictional area 132B of the emergency agency B. The connection control unit 35 connects the communicator 2D to the emergency agency B in whose jurisdictional area 132B the communicator 2D is estimated to be located.

According to the emergency report processing apparatus 3 described above, the problems that occur in FIG. 2B and FIGS. 3 to 6 can be solved. In FIG. 2B, the emergency report from the communicator 2D in the jurisdictional area 132B of the emergency agency B is connected to the wrong emergency agency A instead of being connected to the correct emergency agency B. However, the emergency report processing apparatus 3 in FIG. 7 estimates the location of the communicator 2D (whether it is in the jurisdictional area 132A of the emergency agency A or the jurisdictional area 132B of the emergency agency B) based on the location information that suggests the location of the communicator 2D in the satellite communication cell 132, and can connect the emergency report from a communicator 2D to the appropriate emergency agency B.

Figure 8:
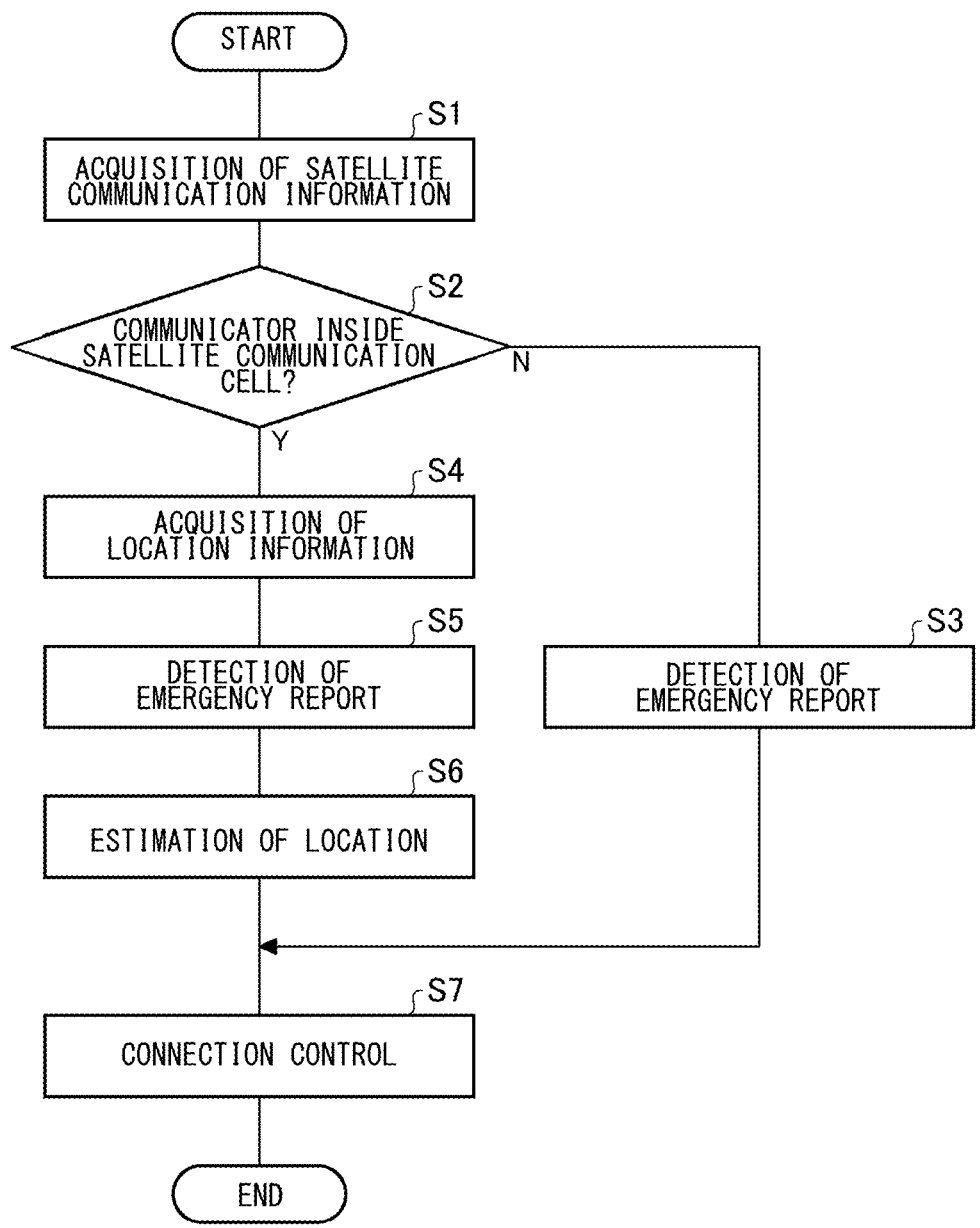
FIG. 8 is a flowchart of processes of the emergency report processing apparatus.

FIG. 8 is a flowchart showing an example of the processes of the emergency report processing apparatus 3 in FIG. 7. In the flowchart, "S" means step or process. In S1, the satellite communication information acquisition unit 32 acquires information indicating that the communicator 2D is in the satellite communication cell 132. In S2, the satellite communication information acquisition unit 32 determines whether or not the communicator 2D is in the satellite communication cell 132. If the communicator 2D is not in the satellite communication cell 132 (No in S2), that is, if the communicator 2D is in the terrestrial communication cell 112, 122, when the emergency report detection unit 31 detects an emergency report from the communicator 2D in S3, the connection control unit 35 connects the communicator 2D to the emergency agency that has jurisdiction over the terrestrial communication cells 112, 122 in S7. As explained in FIG. 3, the connection control unit 35 selects the emergency agency whose jurisdictional area covers the terrestrial communication cell 112, 122, based on the location of the representative point P that can be recognized from the CGI information of the terrestrial communication cell 112, 122.

If the communicator 2D is in the satellite communication cell 132 in S2 (Yes), in S4 the location information acquisition unit 33 obtains the location information suggesting the location of the communicator 2D in the satellite communication cell 132 from the activity data collection unit 4 and/or the communicator 2D. When the emergency report detection unit 31 detects an emergency report from the communicator 2D in S5, in S6 the location estimation unit 34 estimates the location of the communicator 2D (either jurisdictional area of the emergency agency) based on the location information of the communicator 2D acquired in S4. In S7, the connection control unit 35 connects the communicator 2D to the emergency agency in whose jurisdictional area the communicator 2D is estimated to be located.

The present disclosure has been described above based on embodiments. It is understood by those skilled in the art that the embodiments are exemplary and that various variations are possible in the combination of each component and each process thereof, and that such variations are also within the scope of the present disclosure.

The functional configuration of each device described in the embodiment can be realized by hardware resources or software resources, or by the cooperation of hardware resources and software resources. As hardware resources, processors, ROM, RAM, and other LSIs can be used. Operating systems, applications, and other programs can be used as software resources.

The present disclosure relates to technology for processing emergency reports from communicators.

What is claimed is:

1. An emergency report processing apparatus comprising:
an emergency report detection unit that detects an emergency report from a communicator in a communication cell, wherein the communication cell includes a satellite communication cell including at least one jurisdictional area of at least one emergency agency, and wherein the communicator can communicate in the satellite communication cell via a communication satellite;
a location information acquisition unit that acquires location information suggesting the location of the communicator in the satellite communication cell;
a location estimation unit that estimates, based on the location information, that the communicator is in one of a first jurisdictional area of a first emergency agency or a second jurisdictional area of a second emergency agency;

a connection control unit that connects the communicator to the emergency agency of the estimated one of the first and second jurisdictional areas; and a satellite communication information acquisition unit, wherein:

the satellite communication information acquisition unit acquires information indicating that the communicator is in the satellite communication cell, the location information acquisition unit acquires the location information of the communicator in the satellite communication cell from the satellite communication information acquisition unit only when information indicating that the communicator is in the satellite communication cell encompassing a plurality of jurisdictional areas of different emergency agencies is acquired by the satellite communication information acquisition unit, and the location information acquisition unit does not acquire the location information of the communicator from the satellite communication information acquisition unit when the communicator is in a satellite communication cell that encompasses only one jurisdictional area of only one emergency agency.

2. The emergency report processing apparatus according to claim 1, wherein the location information acquisition unit acquires the location information in the satellite communication cell at least for the communicator located in the satellite communication cell.

3. The emergency report processing apparatus according to claim 1, wherein the location information acquisition unit acquires the location information from an activity data collection unit that collects activity data of one or more communicators.

4. The emergency report processing apparatus according to claim 3, wherein the location information acquisition unit acquires the location information from NWDAF (Network Data Analytics Function) as the activity data collection unit.

5. The emergency report processing apparatus according to claim 3, wherein the location information acquisition unit acquires the location information from LMF (Location Management Function) as the activity data collecting unit.

6. The emergency report processing apparatus according to claim 3, wherein the location information acquisition unit acquires historical data of the locations of one or more communicators as the location information from the activity data collection unit.

7. The emergency report processing apparatus according to claim 1, wherein the location information acquisition unit acquires historical data of the location of the communicator as the location information from the communicator.

8. The emergency report processing apparatus according to claim 1, wherein:

the location information acquisition unit acquires the location information in advance, before the emergency report detection unit detects an emergency report from the communicator, only when the information indicating that the communicator is in the satellite communication cell encompassing the plurality of jurisdictional areas of the different emergency agencies is acquired by the satellite communication information acquisition unit, and the location information acquisition unit does not acquire the location information in advance, before the emergency report detection unit detects an emergency report from the communicator, when the communicator is in a satellite communication cell that encompasses only one jurisdictional area of one emergency agency.

9. An emergency report processing method comprising:

detecting an emergency report from a communicator in a communication cell, wherein the communication cell includes a satellite communication cell including at least one jurisdictional area of at least one emergency agency;

acquiring first information indicating that the communicator is in the satellite communication cell;

acquiring location information suggesting the location of the communicator in the satellite communication cell, wherein:

the location information of the communicator in the satellite communication cell is acquired only when the first information indicates that the communicator is in the satellite communication cell encompassing a plurality of jurisdictional areas of different emergency agencies, and the location information of the communicator in the satellite communication cell is not acquired when the first information indicates that the communicator is in a satellite communication cell that encompasses only one jurisdictional area of only one emergency agency;

estimating, based on the location information, that the communicator is in one of a first jurisdictional area of a first emergency agency or a second jurisdictional area of a second emergency agency; and connecting the communicator to the emergency agency of the estimated one of the first and second jurisdictional areas.

10. A non-transitory computer-readable medium storing an emergency report processing program that causes a computer to perform:

detecting an emergency report from a communicator in a communication cell, wherein the communication cell includes a satellite communication cell including at least one jurisdictional area of at least one emergency agency;

acquiring first information indicating that the communicator is in the satellite communication cell;

acquiring location information suggesting the location of the communicator in the satellite communication cell, wherein:

the location information of the communicator in the satellite communication cell is acquired only when the first information indicates that the communicator is in the satellite communication cell encompassing a plurality of jurisdictional areas of different emergency agencies, and the location information of the communicator in the satellite communication cell is not acquired when the first information indicates that the communicator is in a satellite communication cell that encompasses only one jurisdictional area of only one emergency agency;

estimating, based on the location information, that the communicator is in one of a first jurisdictional area of a first emergency agency or a second jurisdictional area of a second emergency agency; and connecting the communicator to the emergency agency of the estimated one of the first and second jurisdictional areas.

* * * * *